US012656799B2

(12) United States Patent
Kamagond et al.

(10) Patent No.: US 12,656,799 B2
(45) Date of Patent: Jun. 16, 2026

(54) CURRENT LIMIT CIRCUITRY WITH CONTROLLED CURRENT VARIATION

(71) Applicant: Texas Instruments Incorporated, Dallas, TX (US)

(72) Inventors: Trilok Kamagond, Bangalore (IN); Sumantra Seth, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 128 days.

(21) Appl. No.: 18/228,570

(22) Filed: Jul. 31, 2023

(65) Prior Publication Data

US 2024/0297642 A1     Sep. 5, 2024

(30) Foreign Application Priority Data

Feb. 27, 2023   (IN) .............................. 202341013140
Mar. 24, 2023   (IN) .............................. 202341020990

(51) Int. Cl.
| | |
|---|---|
| *G05F 1/575* | (2006.01) |
| *G05F 1/46* | (2006.01) |
| *G05F 1/565* | (2006.01) |
| *H02M 3/155* | (2006.01) |

(52) U.S. Cl.
CPC .............. *G05F 1/575* (2013.01); *G05F 1/468* (2013.01); *G05F 1/565* (2013.01); *H02M 3/155* (2013.01)

(58) Field of Classification Search
CPC .......... G05F 1/575; G05F 1/565; G05F 1/468
See application file for complete search history.

(56) References Cited

U.S. PATENT DOCUMENTS

| | | | |
|---|---|---|---|
| 6,975,099 B2 | 12/2005 | Wu et al. | |
| 7,622,902 B1 * | 11/2009 | Kao ......................... | G05F 1/575 323/280 |
| 8,154,263 B1 * | 4/2012 | Shi .......................... | G05F 1/575 323/280 |
| 12,294,355 B2 * | 5/2025 | Takano .............. | H03K 17/0822 |
| 2005/0242796 A1 | 11/2005 | Yang et al. | |
| 2005/0275394 A1 * | 12/2005 | Moraveji ................ | G05F 1/565 323/312 |
| 2006/0152284 A1 | 7/2006 | Morino | |
| 2008/0284395 A1 * | 11/2008 | Wang ........................ | G05F 1/56 323/282 |
| 2009/0128107 A1 | 5/2009 | Wang | |
| 2011/0235222 A1 | 9/2011 | Hong et al. | |
| 2013/0293986 A1 * | 11/2013 | Lerner .................... | G05F 1/573 361/18 |

(Continued)

OTHER PUBLICATIONS

International Search Report for PCT/US2024/017432, dated Jun. 11, 2024.

(Continued)

*Primary Examiner* — Sisay G Tiku
(74) *Attorney, Agent, or Firm* — Xianghui Huang; Frank D. Cimino

(57)     ABSTRACT

Methods, apparatus, systems, and articles of manufacture are disclosed corresponding to current limit circuitry with controlled current variation. An example circuit includes a voltage regulator configured to control a first transistor to regulate a supply voltage to a regulated voltage; and current limit circuitry configured to enable a second transistor to lower an output current when a voltage at a control terminal of the first transistor satisfies a threshold.

21 Claims, 8 Drawing Sheets

(56) References Cited

U.S. PATENT DOCUMENTS

| | | | |
|---|---|---|---|
| 2014/0184182 A1 | 7/2014 | Yajima et al. | |
| 2014/0217999 A1* | 8/2014 | Wibben ................. | G05F 1/468 |
| | | | 323/282 |
| 2014/0355161 A1* | 12/2014 | Torres ..................... | H02H 9/02 |
| | | | 361/93.9 |
| 2017/0047836 A1* | 2/2017 | Endo ........................ | G05F 1/56 |
| 2017/0269622 A1* | 9/2017 | Takada ................... | G05F 1/573 |
| 2020/0004283 A1* | 1/2020 | Sorace ................... | G05F 1/575 |
| 2021/0018944 A1* | 1/2021 | Matyscak .............. | G05F 1/565 |
| 2022/0149792 A1 | 5/2022 | Jaladanki | |
| 2022/0206519 A1* | 6/2022 | Zhong .................... | G05F 1/461 |
| 2022/0337047 A1 | 10/2022 | Yasusaka et al. | |
| 2023/0009164 A1* | 1/2023 | Georgievski ........... | G05F 1/575 |
| 2023/0305585 A1* | 9/2023 | Craescu ................. | G05F 1/575 |
| 2024/0152168 A1* | 5/2024 | Uchimoto .............. | G05F 1/575 |

OTHER PUBLICATIONS

De Lima, J., et al., "A Current Limiter for LDO Regulators with Internal Compensation for Process and Temperature Variations," published in 2008 IEEE International Symposium on Circuits and Systems (ISCAS), May 18-21, 2008, 4 pages.

* cited by examiner

300

FROM IBIAS

VTRIG

301

302

304

LDO_OUT

305

FROM IBIAS

VTRIG

306

R

301

302

304

LDO_OUT

CURRENT LIMIT CIRCUITRY WITH CONTROLLED CURRENT VARIATION

CROSS-REFERENCE TO RELATED APPLICATION

This patent application claims the benefit of and priority to Indian provisional Patent Application Number 202341013140, which was filed on Feb. 27, 2023, Indian provisional Patent Application Number 20234102990, which was filed on Mar. 24, 2023, which are hereby incorporated herein by reference in their entirety.

TECHNICAL FIELD

This description relates generally to circuits, and, more particularly, to current limit circuitry with controlled current variation.

BACKGROUND

Current limit circuitry is used to limit the amount of current that can be drawn by a load. Current limit circuitry may be used in conjunction with a voltage regulator. For example, a voltage regulator may provide a regulated voltage operating on a supply voltage. However, when the current being drawn by a load exceeds a threshold, the current limit circuitry can activate to cap the current. Current limit circuitry can protect against damage caused by faults (e.g., short circuits, overloads, etc.).

SUMMARY

An example of the description includes a circuit which includes a gain stage having a first input terminal, a second input terminal, and an output terminal; a transistor having a first current terminal, a second current terminal, and a control terminal, the first current terminal of the transistor coupled to a supply voltage terminal, the second current terminal of the transistor structured to be coupled to the second input terminal of the gain stage, and the control terminal of the transistor coupled to the output terminal of the gain stage; and regulator compensation circuitry having a first terminal and a second terminal, the first terminal of the regulator compensation circuitry coupled to the output terminal of the first gain stage, the second terminal of the regulator compensation circuitry coupled to the second input terminal of the gain stage.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
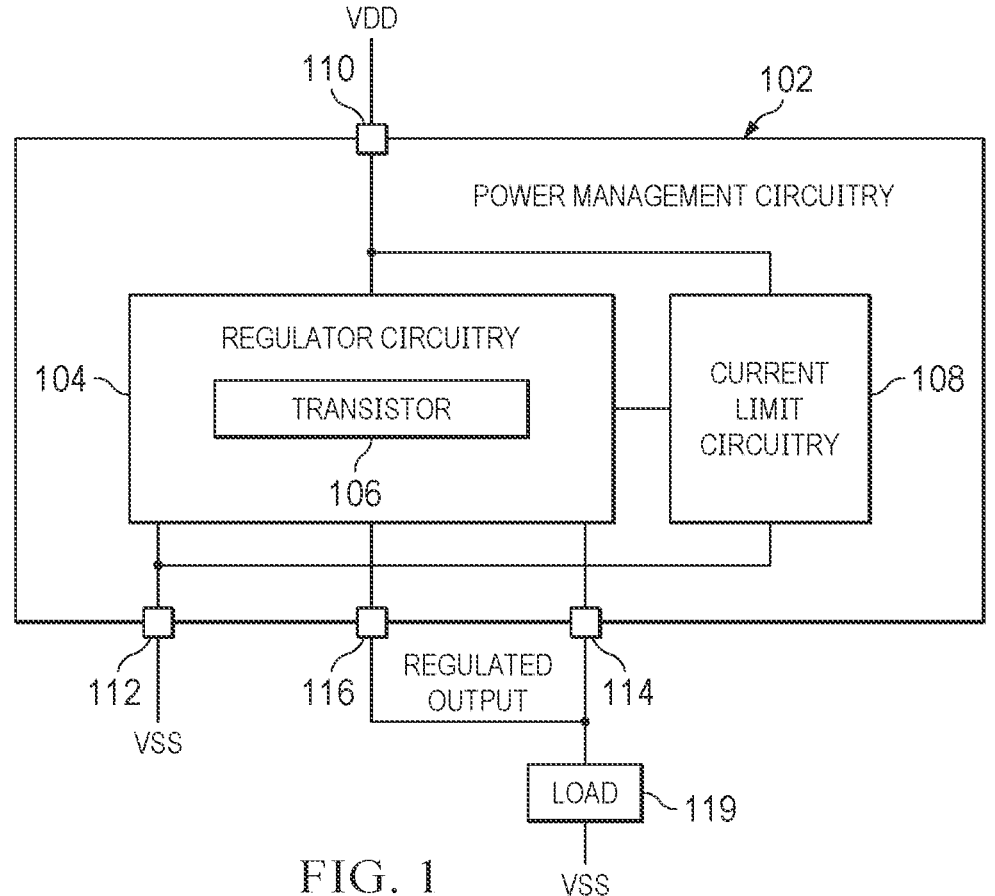
FIG. 1 is an example power management circuitry including example regulator circuitry and current limit circuitry.

The drawings are not necessarily to scale. Generally, the same reference numbers in the drawing(s) and this description refer to the same or like parts. Although the drawings show regions with clean lines and boundaries, some or all of these lines and/or boundaries may be idealized. In reality, the boundaries and/or lines may be unobservable, blended and/or irregular.

Voltage regulators (e.g., low drop out regulators (LDOs), direct current (DC-DC) converters, etc.) are used in various industries (e.g., automotive, industrial, etc.) as part of a power management block to regulate a supply voltage to a regulated voltage. The regulated voltage is used to power a load. The load is any component that consumes the power from the voltage regulator. Current limit circuits may be used in conjunction with a voltage regulator to prevent a load from drawing more than a threshold amount of current. For example, if the load includes overburdened components, and/or a short circuit, the load may draw enough current to cause damage to one or more components of the load and/or one or more components of the voltage regulator. Accordingly, the current limit circuits protect a load and/or a regulator by capping the current that the regulator can provide to the load.

Some voltage regulators regulate the output voltage by utilizing negative feedback. An example of the mechanism of negative feedback for some voltage regulator circuits is further described below. Some regulator circuits include a gain stage to compare a voltage proportional to an output voltage to a reference voltage. In such regulator circuits, if the voltage proportional to the output voltage is lower than the reference voltage, the gain stage increases the voltage at the gate terminal of pass transistor to increase the output voltage. However, if the voltage proportional to an output voltage is greater than the reference voltage, the gain stage reduces the voltage at the gate (e.g., control) terminal of pass transistor to reduce the output voltage. Using the negative feedback, the above processes continue until the voltage proportional to the output voltage is closer to the reference voltage. The pass transistor provides the current to the load from a supply voltage. In some examples, the pass transistor operates in saturation region. The pass transistor is also a part of the negative feedback of the voltage regulator. For example, the gate terminal of the pass transistor is controlled by the gain stage based on the output voltage and the current supplied to the load.

Some current limit circuits utilize a gain stage, a resistor, and a sense transistor to determine when the load current (e.g., the output current and/or the current drawn from the output of the regulator circuit) is above a threshold. The sense transistor is coupled to the pass transistor of the regulator circuit to sense the gate-to-source voltage (VGS) of the pass transistor, which corresponds to the load current. The sensed VGS results in a current that is passed through the resistor to generate a voltage that corresponds to the load current. The gain stage compares the voltage corresponding to the load current to a threshold to determine whether the load current is above a threshold. If the load current is above the threshold, the current limit circuit enables and adjusts the gate voltage of a pull-down transistor. Adjusting the gate voltage of the pull-down transistor causes the pull-down transistor to adjust or control the gate voltage of the pass transistor to a lower value, which limits current flow through the pass transistor.

However, such current limit circuits correspond to high variation (e.g., across process, voltage, temperature, and mismatch) due to the high variation of the resistor. For example, resistor variations can result in a current limit variation of ±24%. Described examples can reduce the current limit variation of such current limit circuits by fixing the VGS of the pass transistor to limit the current flow through the pass transistor. Described examples can reduce the current limitation by eliminating and/or reducing reliance on a resistor to determine whether the load current is above a threshold. Instead, some described examples utilize a gain stage, two transistors and current source circuitry to fix the VGS of the pass transistor to limit the load current to a predefined amount of current. Because the variation of current source circuitry is lower than the variation of a resistor, some described examples results in lower variation in the current limit value across process, voltage, temperature, and/or mismatch. For example, using examples described herein the variation in the current limit value is reduced to ±15% or lower.

Also, unlike some current sense circuits that scale current consumption with the load current to determine if the load current is above a threshold, examples described herein can determine if the load current is above the threshold without scaling the current consumption with the load current, thereby corresponding to an increase in efficiency. For example, some current sense circuits can limit current to 500 milliamps (mA). In such current sense circuitry, if the load current is 100 mA, the current drawn by a sense transistor is 100 microamps (uA). However, when the load current is 400 mA, the current drawn by the sense transistor is 400 uA. Current drawn by examples described herein is limited to a fixed current (e.g., 50 uA) irrespective of the load current.

Also, some regulator circuitry are structured to support a wide range of currents being drawn by a load. However, the wide current range causes variations in poles corresponding to a feedback loop of the regulator circuitry. Poles can lead to stability margins which can cause unwanted ringing (e.g., large voltage variations) at the output of the regulator circuitry. Accordingly, such regulator circuitry require frequency compensation circuitry to compensate for the poles to increase the stability of the regulator circuitry, thereby reducing and/or eliminating the unwanted ringing. In some examples, frequency compensation circuitry includes a capacitor that is coupled to the output of an amplifier of the regulator and to ground. The capacitor compensates for the variations in poles for the desired current range. In some examples, such a capacitor has to be in the nano Farads (nF) range capacitance. For instance, in a particular example, such a capacitor has hundreds of picoFarads (pF) of capacitance to provide sufficient frequency compensation, which correspond to metal capacitors. Metal capacitors are large in dimensions and take up a large amount of silicon area. For example, a 500 pF metal capacitor requires 539,000 square micrometers (um) and a 65 pF metal capacitor requires 70,000 square um.

Examples described herein provides frequency compensation circuitry that results in the ability to utilize a smaller capacitor than other frequency compensation circuitry. For example, using examples described herein frequency compensation can be achieved with one or more capacitors no larger than 7.5 pF of capacitance. Because the voltage across the capacitor included in examples described herein is lesser than other techniques, a metal oxide semiconductor (MOS) capacitor can be implemented, which is smaller than a metal capacitor. For example, the amount of silicon area to implement a 7.5 pF MOS capacitor is 5,500 um. Accordingly, examples described herein result in frequency compensation using 9-67 times less silicon area than other techniques.

FIG. 1 illustrates example power management circuitry 102 having example regulator circuitry 104 and example current limit circuitry 108. The power management circuitry 102 of FIG. 1 includes example regulator circuitry 104, an example transistor 106, the example current limit circuitry 108, example terminals 110, 112, 114, 116, and an example load 119. Although the current limit circuitry 108 is implemented in the power management circuitry 102 of FIG. 1, the current limit circuitry 108 may be implemented by itself (e.g., in a dedicated circuit or IC) or in any circuit where limiting a current is desired.

The power management circuitry 102 of FIG. 1 can be an IC, part of a larger IC, or another component. The power management circuitry 102 can be used to power electrical components, components of a processor, components of a motor driver, and/or components of any circuit that benefits from a regulated voltage.

The regulator circuitry 104 of FIG. 1 is structured (e.g., configured or configurable) to couple to a supply voltage source to obtain a supply voltage (e.g., VDD) via the supply voltage terminal 110. The regulator 104 is structured to couple to ground (or a negative voltage supply) via the ground terminal 112 (e.g., also referred to as the VSS terminal). The regulator circuitry 104 regulates (e.g., converts, adjusts, etc.) the output voltage to a desired value for any disturbance at the output and also regulates for the supply voltage variation at the output.

For example, if there is a sudden change in current which causes the output voltage to dip momentarily, the regulator circuitry 104 adjusts the output voltage to a desired value. As another example, the supply voltage may be too high or may not be stable, which can cause issues when used to power one or more electrical components. Accordingly, the regulator circuitry 104 can convert the unstable and/or high supply voltage to a stable and/or lower regulated voltage. The regulator circuitry 104 can control the transistor 106 (e.g., a pass transistor) to output a regulated voltage, as further described below in conjunction with FIG. 2. The regulator circuitry 104 outputs the regulated voltage via the output terminal 114. The output terminal 114 is structured or adaptive to be connected to any component(s) to power the component(s) (e.g., a load 119) using the regulated voltage. The regulator circuitry 104 controls the transistor 106 based on a measurement of the output voltage obtained via the terminal 116. Although the regulator circuitry 104 obtains the output voltage as part of a feedback loop via an external connection through the output terminal 114 and the terminal 116, the regulator circuitry 104 may be connected internally.

The current limit circuitry 108 of FIG. 1 is coupled to the regulator circuitry 104, the supply voltage terminal 110 and the ground terminal 112. The current limit circuitry 108 controls the VGS of the transistor 106 using a diode-connected transistor and a current source. Also, the current limit circuitry 108 uses a feedback loop to determine when the current being drawn by the load 119 via the output terminal 114 (e.g., the output current or load current) is above a threshold. If the current limit circuitry 108 determines that the output current is above the threshold, the current limit circuitry 108 decreases the output current using a pull-down transistor, as further described below in conjunction with FIG. 2.

Figure 2:
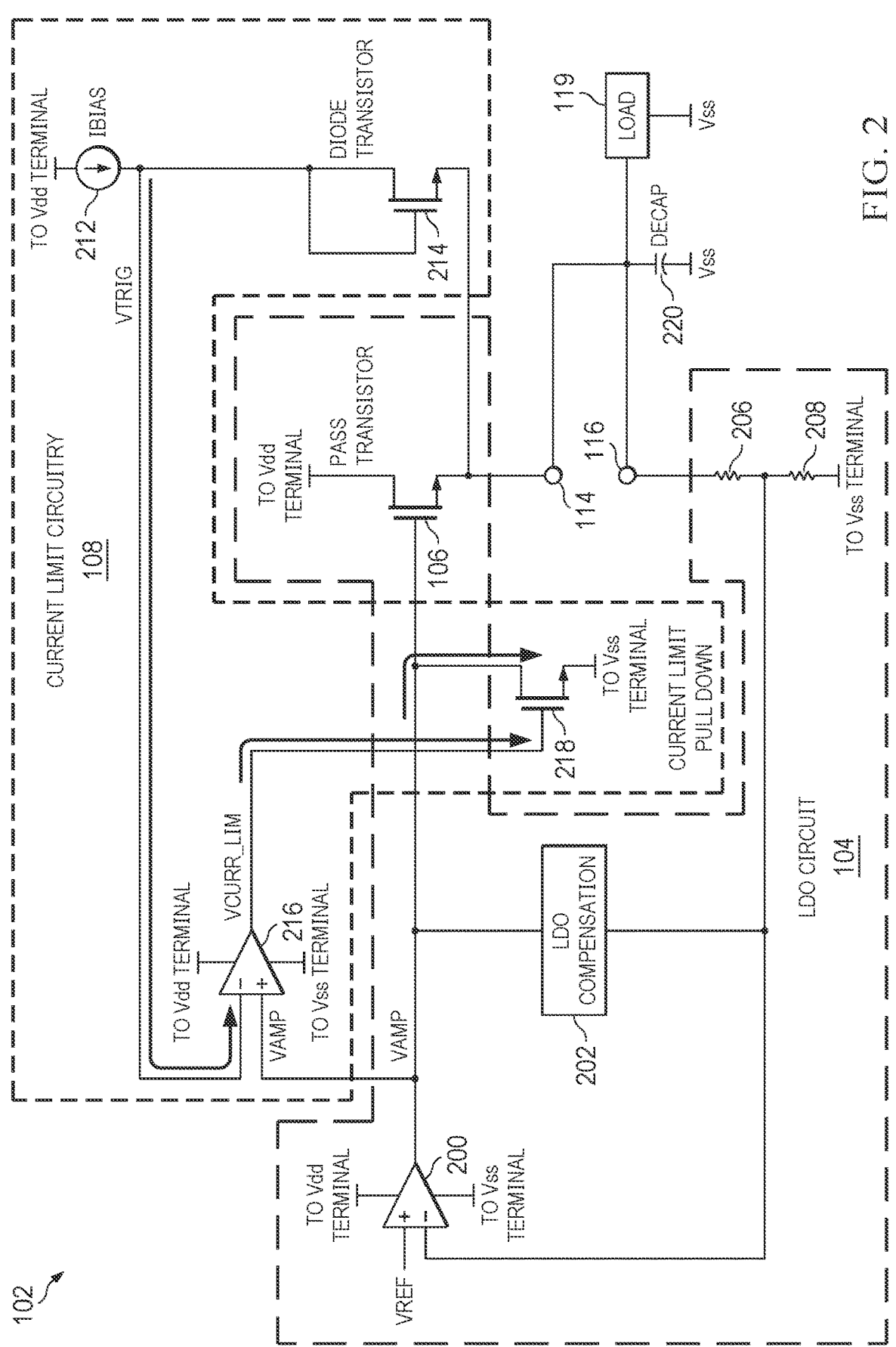
FIG. 2 is an example of the current limit circuitry of FIG. 1.

FIG. 2 is an example circuit diagram of the power management circuitry 102 shown in FIG. 1. The regulator circuitry 104 of FIG. 2 includes an example gain stage 200, example regulator compensation circuitry 202, example resistors 206, 208, and the example transistor 106 of FIG. 1. The current limit circuitry 108 of FIG. 2 includes example current source circuitry 212, an example transistor 214, an example gain stage 216, and an example transistor 218. FIG. 2 further includes the example terminals 114, 116 of FIG. 1, the load 119 of FIG. 1, and an example decoupling capacitor 220.

In the example of FIG. 2, the gain stage 200 (also referred to as gain stage circuitry) may be an amplifier, an error amplifier, an operational amplifier, etc. The gain stage 200 includes a first input terminal, a second input terminal, a positive supply voltage terminal, a negative supply voltage terminal, and an output terminal. The first input terminal (e.g., the non-inverting terminal) of the gain stage 200 is coupled to a reference voltage generator (e.g., bandgap reference circuitry). The second input terminal (e.g., the inverting terminal) of the gain stage 200 is coupled to the regulator compensation circuitry 202 and the resistors 206, 208. The positive supply terminal of the gain stage 200 is coupled to the supply voltage terminal 110. The negative supply terminal of the gain stage 200 is coupled to the ground terminal 112. The output terminal of the gain stage 200 is coupled to the second input terminal of the second example gain stage 216, the regulator compensation circuitry 202, the first current terminal of the transistor 218, and the control terminal of the transistor 106.

The gain stage 200 compares a voltage corresponding to the regulated output voltage at the output terminal 114 to a reference voltage. The voltage corresponding to the regulated output voltage may be a scaled down version of the output voltage (also referred to as a scaled output voltage). If the gain stage 200 determines that the scaled output voltage is higher than the reference voltage, the gain stage 200 controls (e.g., adjusts, decreases, etc.) the output voltage to reduce the voltage at the control terminal of the transistor 106 to a voltage that is determined by the negative feedback. If the gain stage 200 determines that the scaled output voltage is lower than the reference voltage, the gain stage 200 controls (e.g., adjusts, increases, etc.) the output voltage to increase the voltage at the control terminal of the transistor 106 to a voltage that is determined by the negative feedback. The voltage of the control terminal of transistor 106 is also controlled based on the current consumed by the load 119 using the negative feedback. Further operation of the gain stage 200 is described below.

The regulator compensation circuitry 202 of FIG. 2 includes a first terminal and a second terminal. The first terminal of the regulator compensation circuitry 202 is coupled to the output terminal of the gain stage 200, the second input terminal of the gain stage 216, the first current terminal of the transistor 218 and the control terminal of the transistor 106. The second terminal of the regulator compensation circuitry 202 is coupled to the resistors 206, 208, and the second input terminal of the gain stage 200. The regulator circuitry 104 includes a first stage corresponding to the gain stage 200 and a second stage corresponding to the transistor 106.

Accordingly, the regulator compensation circuitry 202 performs frequency compensation (e.g., dominant pole compensation and/or any other type of compensation) to achieve feedback stability. In some examples, the regulator compensation circuitry 202 is implemented in a different location (e.g., coupled to the output terminal of the regulator circuitry 104) of the voltage regulator circuitry 104. Because the example regulator circuitry 104 supports output current from 400 uA to 500 mA, the transconductance of the regulator circuitry 104 can vary, resulting in a 100× movement of a pole.

The regulator compensation circuitry 202 is structured to compensate for the varying pole while reducing the surface area to implement the regulator compensation circuitry 202. For example, the regulator compensation circuitry 202 introduces a zero at the feedback loop (e.g., at the second input terminal of the gain stage 200). The zero compensates for the pole to increase the phase margin and increase the stability of the regulator compensation circuitry 202. The output stage poles and zero track the transconductance (gmpass) of the pass transistor 106. Also, the output stage poles and zero track the capacitance of the decoupling capacitor 220. Because the regulator compensation circuitry 202 is connected to the output of the gain stage 200 and the second input terminal of the gain stage 200, the regulator compensation circuitry 202 introduces an additional fast closed loop path at high frequencies to create a closed loop path as a single pole system. The regulator compensation circuitry 202 achieves unity gain bandwidth (UGB) that is independent of the transconductance of the pass transistor 106 and the decoupling capacitor 220. Implementation of the regulator compensation circuitry 202 is further described below in conjunction with FIGS. 4-7.

The transistor 106 of FIG. 2 is a N-channel metal oxide semiconductor (MOS) field effect transistor (FET) (also referred to as NMOS) that operates as a pass transistor to provide a regulated voltage to the load 119, as further described below. However, the transistor 106 may be implemented as any type of transistor and/or switch. The transistor 106 includes a first current terminal (e.g., a drain terminal), a second current terminal (e.g., a source terminal), and a control terminal (e.g., a gate terminal). The first current terminal of the transistor 106 is coupled to the supply voltage terminal 110. The second current terminal of the transistor 106 is coupled to the output terminal 114. The control terminal of the transistor 106 is coupled to the first current terminal of the transistor 218, the regulator compensation circuitry 202, and the second input terminal of the gain stage 216, and the output terminal of the gain stage 200.

The transistor 106 operates in saturated mode to supply current to the load 119, the current being proportional to a square of a difference between the gate-to-source voltage of the transistor 106 and the threshold voltage of the transistor 106. Also, the transistor 106 reduces the impact of the supply noise on the regulated output voltage. The voltage regulation at the output terminal 114 is controlled by the control terminal of the transistor 106. For example, when the gain stage 200 increases the VAMP voltage at the gate of the pass transistor 106, the pass transistor 106 increases the output voltage to achieve a desired output voltage at terminal 114. When the gain stage 200 decreases the VAMP voltage at the gate of the pass transistor 106, the pass transistor 106 decreases the output voltage to achieve a desired output voltage at terminal 114. In some examples, the above circuit operation description provides a simplistic description. The pass transistor 106 is a part of the negative feedback of the voltage regulator circuitry 104. For example, the control terminal of the pass transistor 106 is controlled by the gain stage 200 based on or responsive to the output voltage and the current supplied to the load 119.

The resistor 206 of FIG. 2 includes a first terminal and a second terminal. The first terminal of the resistor 206 is coupled to the feedback terminal 116. The second terminal of the resistor 206 is coupled to the first terminal of the resistor 208 and the second input terminal of the gain stage 200. The resistor 208 includes a first terminal and a second terminal. The first terminal of the resistor 208 is coupled to the second terminal of the resistor 206 and the second input terminal of the gain stage 200. The second terminal of the resistor 208 is coupled to the ground terminal 112. The resistors 206, 208 of FIG. 2 are structured or arranged to function or operate as a voltage divider. Accordingly, the voltage at the terminal between the two resistors 206, 208 is a scaled version of the output voltage at the output terminal 114.

The transistor 214 of FIG. 2 is an NMOS transistor that functions or operates as a diode to allow current from the current source circuitry 212 to flow from the first current terminal of the transistor 214 to the second current terminal of the transistor 214. However, the transistor 214 may be any type of transistor. The transistor includes the first current terminal (e.g., a drain terminal), the second current terminal (e.g., the source terminal) and a control terminal (e.g., the gate terminal). The first current terminal of the transistor 214 is coupled to the current source circuitry 212, the first input terminal of the gain stage 216 and the control terminal of the transistor 214. The second current terminal of the transistor 214 is coupled to the second current terminal of the transistor 106 and the output terminal 114. The control terminal of the transistor 214 is coupled to the first current terminal of the transistor 214, the current source circuitry 212 and the first input terminal of the gain stage 216. The first current terminal of the transistor 214 is coupled to the control terminal of the transistor 214.

Thus, the transistor 214 is structured or arranged to operate as a diode-connected transistor. The diode-connected transistor 214 allows current to travel from the first current terminal of the transistor 214 to the second current terminal of the transistor 214. The transistor 214 uses the current generated by the current source circuitry 212 to create a voltage drop across the current terminals of the transistor 214 (e.g., corresponding to the VTRIG voltage and/or the VOUT voltage). To limit the amount of current drawn by the transistor 214, the size (e.g., channel width and/or channel length) of the transistor 214 may be much smaller than the transistor 106. For example, the size of the transistor 214 may be 1000 times smaller than the transistor 106. Alternative structures for the transistor 214 are further described below in conjunction with FIGS. 3A and 3B.

The current source circuitry 212 of FIG. 2 may be implemented using P-channel MOS circuitry based on a bandgap reference circuit, and/or any other current source circuitry. The current source circuitry 212 includes a first terminal and a second terminal. The first terminal of the current source circuitry 212 is coupled to the supply voltage terminal 110 and the second terminal of the current source circuitry 212 is coupled to the first input terminal of the gain stage 216, the first current terminal of the transistor 214, and the control terminal of the transistor 214. The current source circuitry 212 generates a current that flows toward the first current terminal of the transistor 214.

The gain stage 216 (also referred to as gain stage circuitry) of FIG. 2 may be an amplifier, an error amplifier, an operational amplifier, etc. The gain stage 216 includes a first input terminal, a second input terminal, a positive supply voltage terminal, a negative supply voltage terminal, and an output terminal. The first input terminal (e.g., the inverting terminal) of the gain stage 216 is coupled to the current source circuitry 212, the first current terminal of the transistor 214 and the control terminal of the transistor 214. The second input terminal (e.g., the non-inverting terminal) of the gain stage 216 is coupled to the output of the gain stage 200, the regulator compensation circuitry 202, the first current terminal of the transistor 218, and the control terminal of the transistor 106. The positive supply terminal of the gain stage 216 is coupled to the supply voltage terminal 110. The negative supply terminal of the gain stage 216 is coupled to the ground terminal 112. The output terminal of the gain stage 216 is coupled to the control terminal of the transistor 218.

The gain stage 216 compares a voltage (e.g., VTRIG) at the first current terminal of the transistor 214 to the voltage output by the gain stage 200 (e.g., VAMP). The VTRIG voltage at the first current terminal of the transistor 214 corresponds to the regulated voltage at the output terminal (e.g., VTRIG is a sum of the regulated voltage (VOUT) and the VGS of the transistor 214). If the gain stage 216 determines that VAMP is lower than VTRIG, the gain stage 216 behaves as comparator and outputs a low voltage (e.g., 0 volts (V)) at the control terminal of the transistor 218 disabling the current limit loop. If the gain stage 216 determines that VAMP is higher than VTRIG, the gain stage 216 outputs a controlled high voltage based on the excessive current trying to be drawn from the output terminal 114. The controlled high voltage limits the VAMP voltage to the VTRIG voltage. The larger the difference between the VAMP voltage and the VTRIG voltage, the higher the output voltage (VCURR_LIM), which can be set based on the excessive load current drawn from the threshold, gain of the stage 216, etc. Further operation of the gain stage 216 is further described below.

The transistor 218 of FIG. 2 is a NMOS transistor that operates as a pull-down transistor, switch, and/or current source to lower the VAMP when enabled, as further described below. However, the transistor 218 may be implemented as any type of transistor and/or switch. The transistor 218 includes a first current terminal (e.g., a drain terminal), a second current terminal (e.g., a source terminal), and a control terminal (e.g., a gate terminal). The first current terminal of the transistor 218 is coupled to the output of the gain stage 200, the second input terminal of the gain stage 216, the regulator compensation circuitry 202, and the control terminal of the transistor 106. The second current terminal of the transistor 218 is coupled to the ground terminal 112. The control terminal of the transistor 218 is coupled to the output terminal of the gain stage 216.

The transistor 218 is enabled (e.g., turned on, operates as a closed switch, operates as a current source, etc.) when the voltage at the output terminal of the gain stage 216 is high (e.g., when the VAMP voltage exceeds the VTRIG voltage). When enabled (e.g., in linear and/or saturation mode), the transistor 218 draws current toward ground from the gain stage 200. The amount of current that the transistor 218 draws toward ground may depend on the voltage set by the gain stage 216. As described above the voltage set by the gain stage 216 depends on the load current attempting to be drawn by the external load 119, gain of the stage 216, etc. The transistor 218 is disabled (e.g., turned off, operates as an open switch, etc.) responsive to the voltage at the output terminal of the gain stage 216 being low (e.g., below the threshold). When disabled (e.g., when the VAMP voltage is below the VTRIG voltage), the transistor 218 is turned off and does not decrease the voltage at the control terminal of the pass transistor 106.

Initially, in an example operation, when the power management circuitry 102 first starts up, the voltage at the output terminal 114 is low (e.g., 0 V). Thus, because the resistors 206, 208 operates as a voltage divider, the voltage at the second input terminal of the gain stage 200 is also low (e.g., lower than the reference voltage at the first input terminal of the gain stage 200). Because the voltage (VREF) at the first input terminal is higher than the voltage at the second input terminal, the gain stage 200 outputs a high voltage (VDD), thereby enabling the transistor 106. As described above, the output voltage at the load 119 to increase using the supply voltage via the supply voltage terminal 110 in response to enabling the transistor 106. As the output voltage at the output terminal 114 increases, the voltage at second input terminal of the gain stage 200 increases because the voltage at the second input terminal of the gain stage 200 is a scaled version of the output voltage. When the second input terminal of the gain stage 200 increases closer to the reference voltage, the gain stage 200 adjusts and/or controls (increases etc.) the gate voltage of the transistor 106 to generate the expected and/or desired output voltage at the output terminal 114. Accordingly, the second terminal of the example gain stage 200 is prevented from exceeding the reference voltage through the negative feedback. Any disturbance in the output voltage brings the second terminal of the gain stage 200 to the reference voltage by the negative feedback.

If the current drawn by the load 119 from the transistor 106 is too high (e.g., above a threshold), the output voltage at the output terminal 114 starts to drop to a lower voltage and the gain stage 200 may no longer be able to regulate the output voltage. Accordingly, when the output current is too high, the current limit circuitry 108 limits the current to ensure that the output current does not go above a threshold. The current source circuitry 212 generates a bias current that flows across the current terminals of the diode-connected transistor 214 to generate a voltage (VTRIG) at the first current terminal of the transistor 214. As described above the VTRIG voltage is a function of the output voltage. For example, the VTRIG voltage corresponds to a sum of the regulated voltage (VOUT) and the VGS of the transistor 214. Accordingly, when the current being drawn by the load 119 exceeds a threshold, the VAMP voltage becomes be higher than the VTRIG voltage causing the gain stage 216 to generate a control voltage, VCURR_LIM, to the gate terminal (e.g., control terminal) of the pull-down transistor 218.

The amount of control voltage is based on the difference between the VAMP voltage and the VTRIG voltage, which is set based on the excessive current drawn from the threshold, gain of the stage 216, etc. The control voltage enables the pull-down transistor 218. When enabled, the pull-down transistors 218 draws current from the gain stage 200 to reduce the VAMP voltage closer to the VTRIG voltage through negative feedback. When the current being drawn by the load 119 is the less than the threshold, the VAMP voltage is lower than the VTRIG voltage, thereby causing the current limit circuitry 108 to be non-operational. Thus, the voltage regulator circuitry 104 operates to generate the desired output voltage.

Figure 3A:
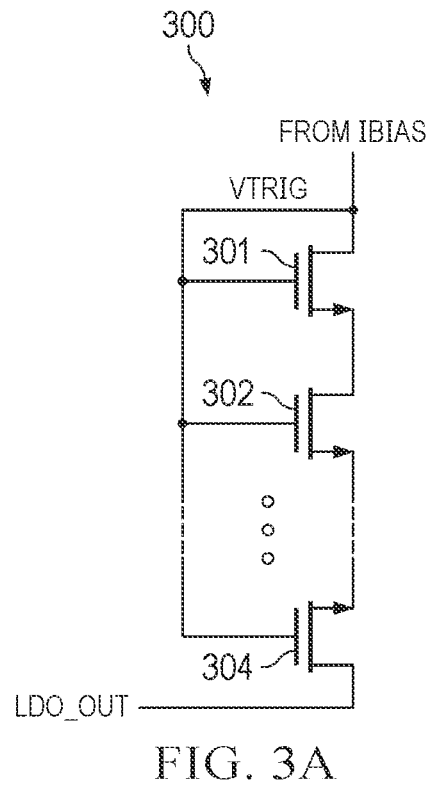
FIGS. 3A and 3B illustrate alternative circuits for a diode-connected transistor of FIG. 2.

FIG. 3A illustrates an alternative diode-connected transistor structure 300 for the diode-connected transistor 214 of FIG. 2. FIG. 3A includes N number of stacked transistors 301, 302, 304. As described above, VTRIG is a voltage threshold used to cap the current. Thus, adjusting the VTRIG adjusts the maximum amount of current that can be drawn by the load 119 of FIG. 2. The VTRIG voltage can be adjusted by either using a different sized transistor or stacking additional transistors. Although FIG. 3A includes three stacked transistors 301, 302, 304, there may be any number of stacked transistors to achieve a desired VTRIG. In this example, more transistors corresponding to a higher VTRIG.

In the diode-connected transistor structure 300 of FIG. 3A, the transistors 301, 302, 304 are NMOS transistors that operates as a diode to allow current from the current source circuitry 212 to flow from the current source circuitry 212 to the output terminal 114 of FIG. 2. However, the transistors 301, 302, 304 may be any type of transistor. The transistor 301 includes a first current terminal, a second current terminal, and a control terminal. The first current terminal of the transistor 301 is coupled to the current source circuitry 212, the first input terminal of the gain stage 216, and the control terminals of the transistors 301, 302, 304. The second current terminal of the transistor 301 is coupled to the first current terminal of the transistor 302. The control terminal of the transistor 301 is coupled to the first current terminal of the transistor 301, the control terminals of the transistors 302, 304, the current source circuitry 212, and the first input terminal of the gain stage 216.

The transistor 302 includes a first current terminal, a second current terminal, and a control terminal. The first current terminal of the transistor 302 is coupled to the second current terminal of the transistor 302. The second current terminal of the transistor 302 is coupled to the first current terminal a subsequent transistor (e.g., the transistor 304 if three transistors are stacked). The control terminal of the transistor 302 is coupled to the first current terminal of the transistor 302, the control terminals of the transistors 301, 304, the current source circuitry 212, and the first input terminal of the gain stage 216.

The transistor 304 includes a first current terminal, a second current terminal, and a control terminal. The first current terminal of the transistor 304 is coupled to the second current terminal of a preceding transistor (e.g., the transistor 302, if three transistors are implemented). The second current terminal of the transistor 304 is coupled to the output terminal 114 and the second current terminal of the transistor 106 of FIGS. 1 and/or 2. The control terminal of the transistor 304 is coupled to the first current terminal of the transistor 304, the control terminals of the transistors 301, 302, the current source circuitry 212, and the first input terminal of the gain stage 216.

Because the transistor 301 operates as a diode-connected transistor (e.g., operating in the saturation region) and the transistors 302, 304 (e.g., operating in the linear region) use the same control terminal voltage, there is a voltage drop across the current terminals of each of the transistors 301, 302, 304. Accordingly, the VTRIG voltage is increased based on the number of stacked transistors 301, 302, 304. Because the transistors 301, 302, 304 can be the same size, increasing the number of transistors can increase the VTRIG voltage without drawing additional current, thereby maintaining power efficiency.

Figure 3B:
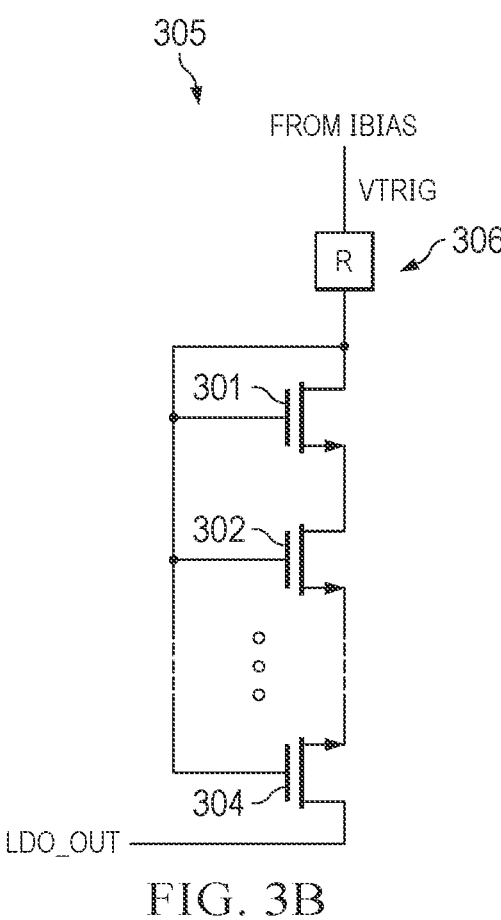

FIG. 3B illustrates an alternative diode-connected transistor structure 305 for the diode-connected transistor 214 of FIG. 2. FIG. 3B includes N number of stacked transistors 301, 302, 304 and an example resistor 306. As described above, VTRIG is a voltage threshold used to limit the current. Thus, adjusting the VTRIG adjusts the maximum amount of current that can be drawn by the load 119 of FIG. 2. Like the structure 300 of FIG. 3B, the structure of FIG. 3A may be used to increase and/or otherwise adjust the VTRIG voltage without drawing more current. For example, if VTRIG is to be increased, the example transistors 301, 302, 304 can be stacked to increase the VTRIG voltage without increasing the amount of current being drawn. Although FIG. 3B includes three stacked transistors 301, 302, 304, there may be any number of stacked transistors to achieve a desired VTRIG (e.g., more transistors corresponding to a higher VTRIG).

FIG. 3B includes a small resistor 306 to further tune the VTRIG voltage to a desired voltage. As described above, the variance in the resistor can introduce variance to the current limit. The resistor 306 creates a voltage drop across the terminals to increase the VTRIG voltage. The resistor 306 includes two terminals. The first terminal of the resistor 306 is coupled to the current source circuitry 212 and the first input terminal of the gain stage 216. The second terminal of the resistor 206 is coupled to the first current terminal of the transistor 301 and the control terminals of the transistors 301, 302, 304.

Figure 4:
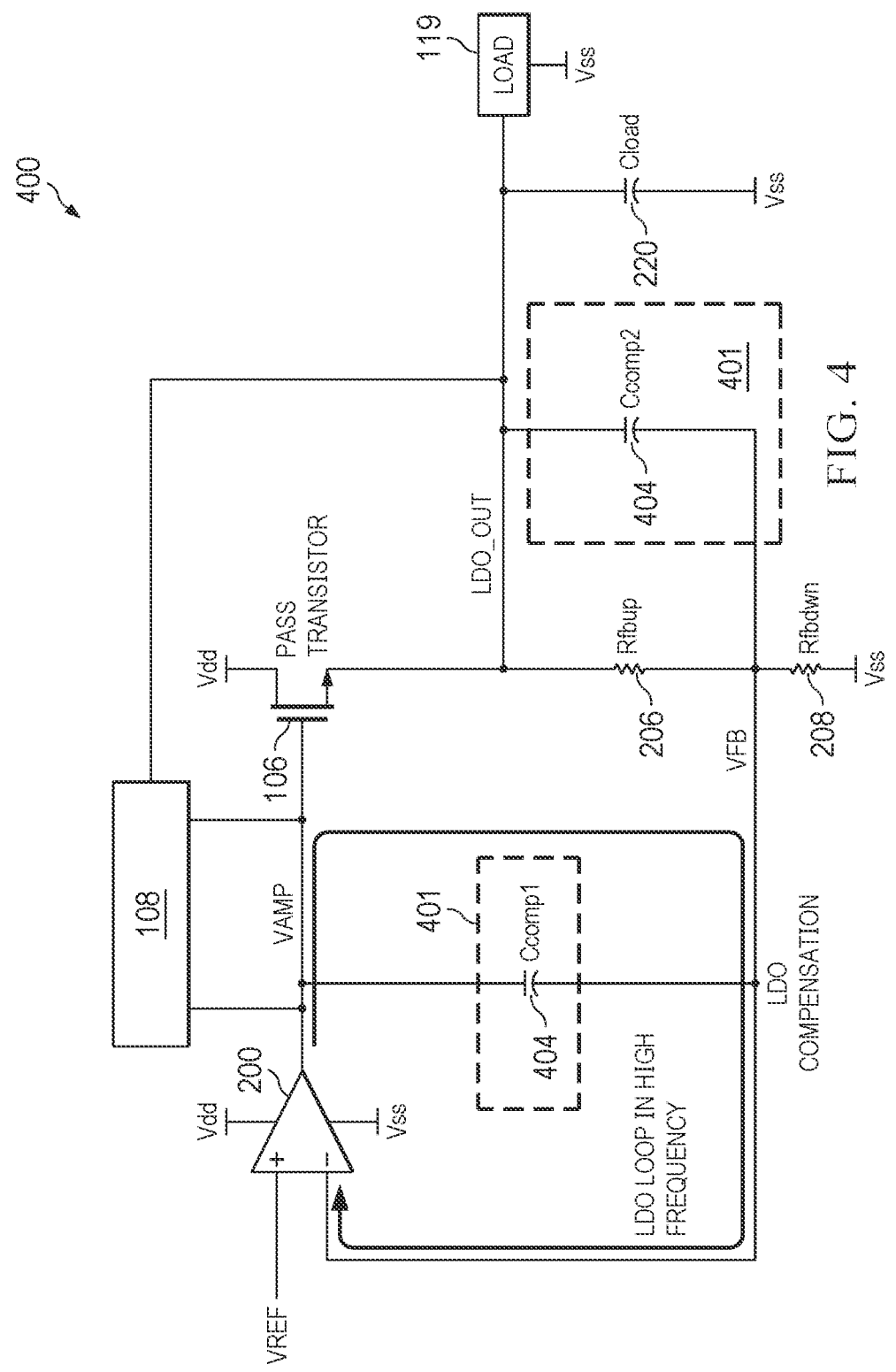
FIG. 4 is an example of compensation circuitry in the voltage regulator of FIG. 1.

FIG. 4 illustrates example regulator circuitry 400 including a circuit implementation of the regulator compensation circuitry 202 of FIG. 2 in conjunction with the regulator circuitry 102 of FIG. 2. FIG. 4 includes the pass transistor 106, the current limit circuitry 108, the load 119, the resistors 206, 208, and the capacitor 220 of FIG. 2. FIG. 4 further includes regulator compensation circuitry 401 to implement the regulator compensation circuitry 202 of FIG. 2. The regulator compensation circuitry 401 includes example capacitors 402, 404. Although FIG. 4 includes the second terminal of the current transistor 106 and the first terminal of the resistor 206 directly coupled, the terminals may be coupled via a connection to two external terminals (e.g., as shown in the terminal connection in FIG. 2 via the terminals 114, 116 of FIGS. 1 and/or 2).

The capacitor 402 of FIG. 4 includes two terminals. The first terminal of the capacitor 402 is coupled to the output terminal of the gain stage 200, the current limit circuitry 108, and the control terminal of the transistor 106. The capacitor 402 may be a MOS capacitor. The capacitor 402 provides a fast loop path for high frequency operation. The capacitor 402 connected to the feedback loop introduces a zero to compensate for the pole at the output stage of the regulator circuitry 400. The regulator circuitry 400 may also have a pole at the VAMP terminal. The below Equation 1 corresponds to the frequency at which a zero introduce due to the capacitor 402 (e.g., when capacitor 404 is not included).

$$\frac{gm_{pass}}{2C_{load}}\left[-1 \pm \sqrt{1 - \frac{4C_{load}}{gm_{pass}R_{fb_{up}}C_{comp1}}}\right] \qquad \text{(Equation 1)}$$

In the above Equation 1, gmpass is the transconductance of the pass transistor 106, Cload is the capacitance of the load capacitor 220, Rfbup is the resistance of the resistor 206, and Ccomp1 is the capacitance of the capacitor 402. Although the zero can be used to mitigate the pole at the output stage of the regulator circuitry 400, the capacitor introduces a complex conjugate zero whenever the value in the square root is less than 0. Complex conjugate zeros in open loop results into complex conjugate poles in closed loop. Accordingly, to mitigate the complex conjugate zero, the example capacitor 404 can be added to the regulator circuitry 400. The structure of the capacitor 402 allows the UGB to be independent of the transconductance of the pass transistor 106 and the decoupling capacitor 220 without affecting the output voltage. Instead the UGB is dependent on the transconductance of the gain stage 200 (e.g., UGB=gm_err_amp/C0, where gm_err_amp is the transconductance of the gain stage 200 and C0 corresponds to the capacitance between the control terminal and the second current terminal of the transistor 106).

The example capacitor 404 of FIG. 4 includes two terminals. The first terminal of the capacitor 404 is coupled to and/or structured to be coupled to the output terminal of the linear regulator circuitry 400 (LDO_out), the current limit circuitry 108, the capacitor 220, the load 119, the second current terminal of the transistor 106 (e.g., directly or via external terminals such as terminals 114, 116 of FIGS. 1 and/or 2), and the first terminal of the resistor 206. The second terminal of the capacitor 404 is coupled to the second terminal of the resistor 206, the first terminal of the resistor 208, the second terminal of the capacitor 402, and the second input terminal of the gain stage 200. With the structures of the capacitors 402, 404, the regulator compensation circuitry 400 utilize capacitor division to compensate for the pole and the complex conjugate zero. The capacitor 404 add a degree of freedom to above Equation 1 to introduce the zero at a frequency corresponding to the below Equation 2 while mitigating the complex conjugate zero of Equation 1.

$$\frac{gm_{pass}}{2C_{load}}\left[-\left(1 + \frac{C_{comp2}}{C_{comp1}}\right) \pm \sqrt{\left(1 + \frac{C_{comp2}}{C_{comp1}}\right)^2 - \frac{4(C_{load} + C_{comp2})}{gm_{pass}R_{fb_{up}}C_{comp}}}\right] \qquad \text{(Equation 2)}$$

In the above Equation 1, Ccomp2 corresponds to the capacitance of the capacitor 404. As shown in the above Equation 2, the capacitance of the capacitor 404 decreases the values at which the value under the square root can be zero, thereby mitigating the complex conjugate zero of the above Equation 1.

Figure 5:
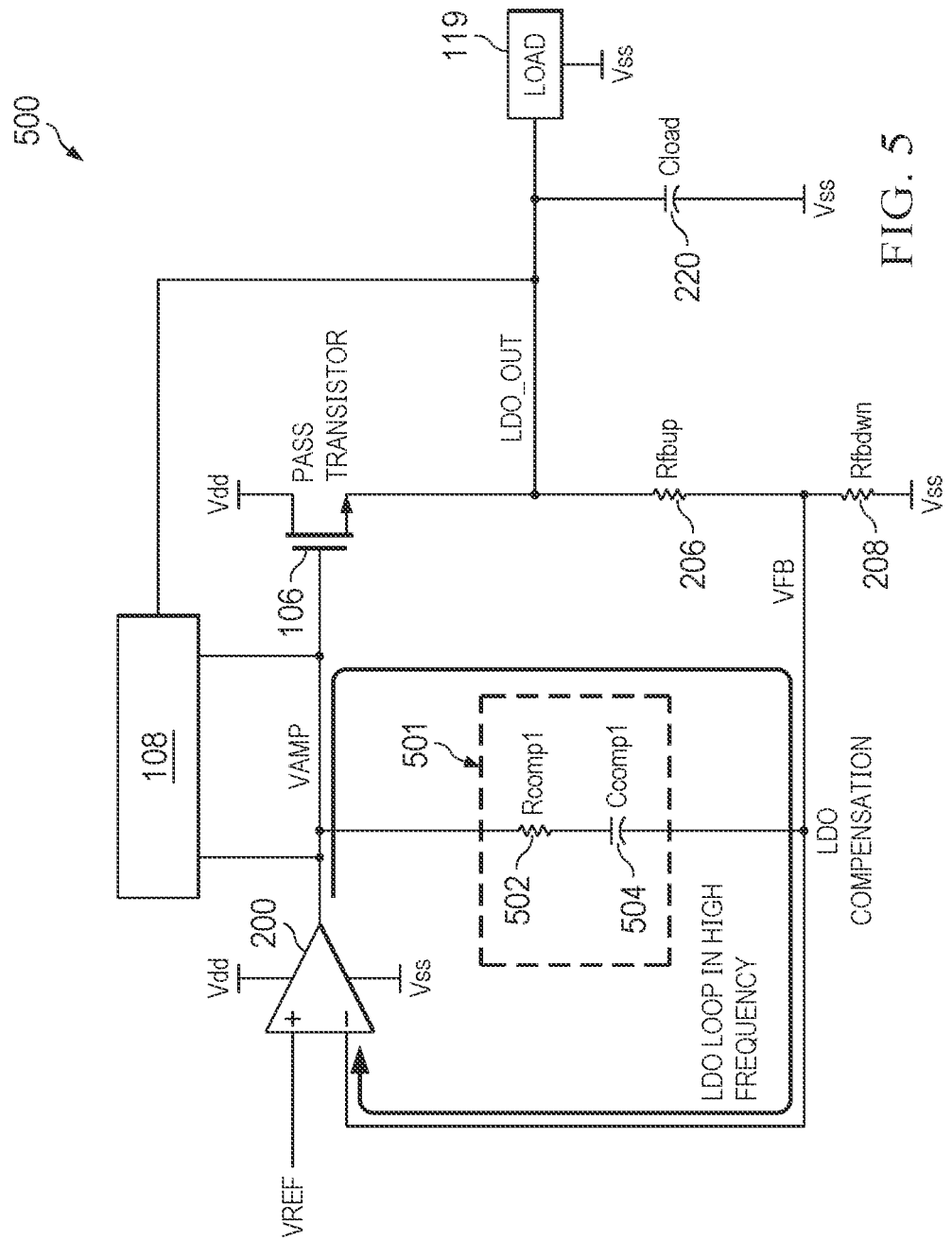
FIG. 5 is another example of the compensation circuitry in the voltage regulator of FIG. 1.

FIG. 5 illustrates example regulator circuitry 500 including an alternative circuit implementation of the regulator compensation circuitry 202 of FIG. 2 in conjunction with the regulator circuitry 102 of FIG. 2. FIG. 5 includes the pass transistor 106, the current limit circuitry 108, the load 119, the resistors 206, 208, and the capacitor 220 of FIG. 2. FIG. 5 further includes regulator compensation circuitry 501 to implement the regulator compensation circuitry 202 of FIG. 2. The regulator compensation circuitry 501 includes an example resistor 502 and an example capacitor 504. Although FIG. 5 includes the second terminal of the current transistor 106 and the first terminal of the resistor 206 directly coupled, the terminals may be coupled via a connection to two external terminals (e.g., as shown in the terminal connection in FIG. 2 via the terminals 114, 116 of FIGS. 1 and/or 2).

The example resistor 502 of FIG. 5 includes two terminals. The first terminal of the resistor 502 is coupled to the current limit circuitry 108, the output terminal of the gain stage 200, and the current terminal of the transistor 106. The second terminal of the resistor 502 is coupled to a first terminal of the capacitor 504. The capacitor 504 includes two terminals. The first terminal of the capacitor 504 is coupled to the second terminal of the resistor 502. The second terminal of the capacitor 504 is coupled to the second terminal of the resistor 206, the first terminal of the resistor 208, and the second input terminal of the gain stage 200. The resistor 502 and the capacitor 504 are connected in series.

In the example of FIG. 5, the regulator compensation circuitry 501 introduces zeros by a resistor division method, where the frequency at which the zeros are introduced based on the resistance of the resistors 502, 206, as shown in the below Equation 3.

$$\frac{gm_{pass}}{2C_{load}}\left[-\left(1+\frac{R_{comp1}}{R_{fb_{up}}}\right)\pm\sqrt{\left(1+\frac{R_{comp1}}{R_{fb_{up}}}\right)^2-\frac{4C_{load}}{gm_{pass}R_{fb_{up}}C_{comp1}}}\right]$$

(Equation 3)

In the above Equation 3, Rcomp1 is the resistance of the resistor 502. Similar to the structure of FIG. 4, the regulator compensation circuitry 501 of FIG. 5 introduce a degree of freedom to the Equation 1 using the resistance of the resistor 502. Accordingly, the resistance of the resistor 502 decreases the values at which the value under the square root can be zero, thereby mitigating the complex conjugate zero (e.g., reducing the complex conjugation) associated with the above Equation 1. The complex conjugate is more likely to be an issue when lower currents are supplied by the voltage regulator 500. Thus, the resistance of the resistor 502 and the capacitance of the capacitor 504 can be selected to prevent complex conjugates at the lower spectrum of the supplied output current while minimizing silicon area. The close loop response of the regulator circuitry 500 can be equated to the second order Butterworth Filter equation as it gives an underdamped response. The first order Butterworth filter equation is given by the below Equation 4).

$$\frac{s^2}{w_0^2}+\sqrt{2}\frac{s}{w_0}+1$$

(Equation 4)

The closed loop response can be equated to the second order Butterworth filter and conditioned for determining the resistance of the resistor 502 can be calculated. The condition is given by the below Equation 5.

$$R_{comp1}=\sqrt{\frac{2C_{load}R_{fb_{up}}}{C_{comp1}gm_{pass}}}.$$

(Equation 5)

If the capacitance of the capacitor 504 and the resistance of the resistor 206 are fixed based on the above Equations 4 and 5, the resistance of the resistor 502 can be determined to satisfy the above-Equation 3. The structure of the capacitor 504 allows the UGB to be independent of the transconductance of the pass transistor 106 and the decoupling capacitor 220 without affecting the output voltage. Instead the UGB is dependent on the transconductance of the gain stage 200 (e.g., UGB=(gm_err_amp/C0)(Rfbup/(Rfbup+Rcomp1))).

Figure 6:
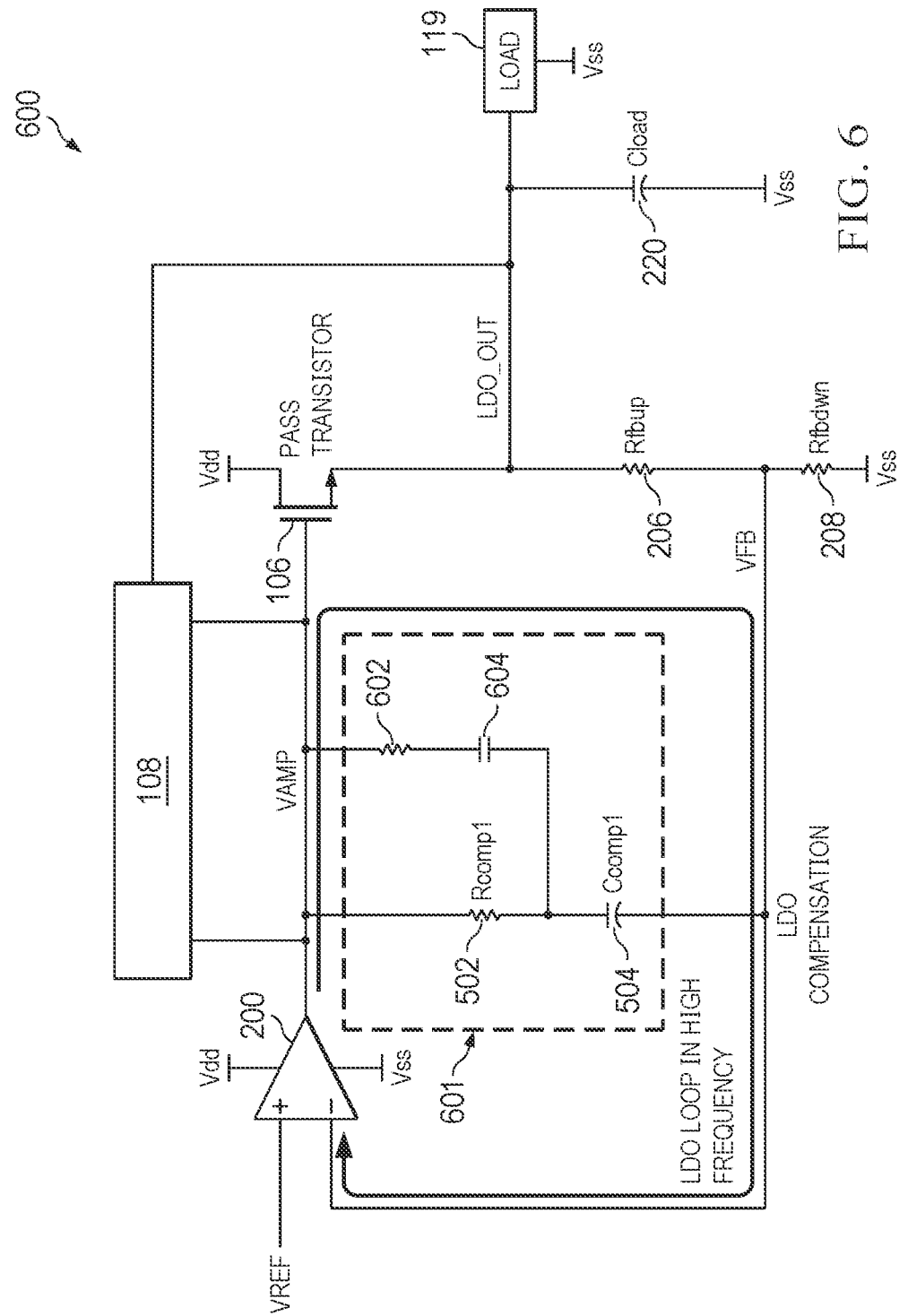
FIG. 6 is another example of the compensation circuitry in the voltage regulator of FIG. 1.

FIG. 6 illustrates example regulator circuitry 600 including an alternative circuit implementation of the regulator compensation circuitry 202 of FIG. 2 in conjunction with the regulator circuitry 102 of FIG. 2 that improves the phase margin at higher output currents. FIG. 6 includes the pass transistor 106, the current limit circuitry 108, the load 119, the resistors 206, 208, and the capacitor 220 of FIG. 2. FIG. 6 further includes regulator compensation circuitry 601 to implement the regulator compensation circuitry 202 of FIG.

2. The regulator compensation circuitry 601 includes the example resistor 502 and the example capacitor 504 of FIG. 5. The regulator compensation circuitry 601 further includes an example resistor 602 and a capacitor 604. Although FIG. 6 includes the second terminal of the current transistor 106 and the first terminal of the resistor 206 directly coupled, the terminals may be coupled via a connection to two external terminals (e.g., as shown in the terminal connection in FIG. 2 via the terminals 114, 116 of FIGS. 1 and/or 2).

The example resistor 602 of FIG. 6 includes two terminals. The first terminal of the resistor 602 is coupled to the current limit circuitry 108, the output terminal of the gain stage 200, the first terminal of the resistor 502, and the current terminal of the transistor 106. The second terminal of the resistor 602 is coupled to a first terminal of the capacitor 604. The capacitor 604 includes two terminals. The first terminal of the capacitor 604 is coupled to the second terminal of the resistor 602. The second terminal of the capacitor 604 is coupled to the second terminal of the resistor 502 and the first terminal of the capacitor 504. The resistor 602 and the capacitor 604 are connected in series. The series connection of the resistor 602 and capacitor 604 are coupled in parallel with the resistor 502.

The resistor 602 and the capacitor 604 are added to increase and/or otherwise improve the phase margin for high output current situations. When the output current is high (e.g., 500 milliamps (mA)), the phase margin may be reduced to 40 degrees (E.g., from 90 degrees), thereby making the regulator circuitry less stable. As the transconductance of the pass transistor 106 increases, the poles and zeros move to track the change in transconductance. The increased gap causes phase degradation. To mitigate reduction of phase margins at high currents, a lower resistance of the resistor 502 is beneficial at higher frequencies. Thus, the example resistor 602 and the capacitor 604 are included to increase the phase margin for higher frequency situations. By the capacitor 604 ensures during high frequency situations, the resistor 502 and the resistor 602 are structured in parallel, thereby lowering the resistance between the output terminal of the gain stage 200 and the second input terminal of the gain stage 200 (e.g., via the capacitor 504). During low frequency situations, the capacitor 604 prevents and/or decoupled the parallel connection and the resistance between the output terminal of the gain stage 200 and the second input terminal of the gain stage 200 is a function of resistance of the resistor 502. The frequency at which the resistance and/or impedance starts reducing is given by the below Equation 6.

$$Frequency=\frac{1}{2\pi R_{comp2}C_{comp2}}$$

(Equation 6)

Figure 7:
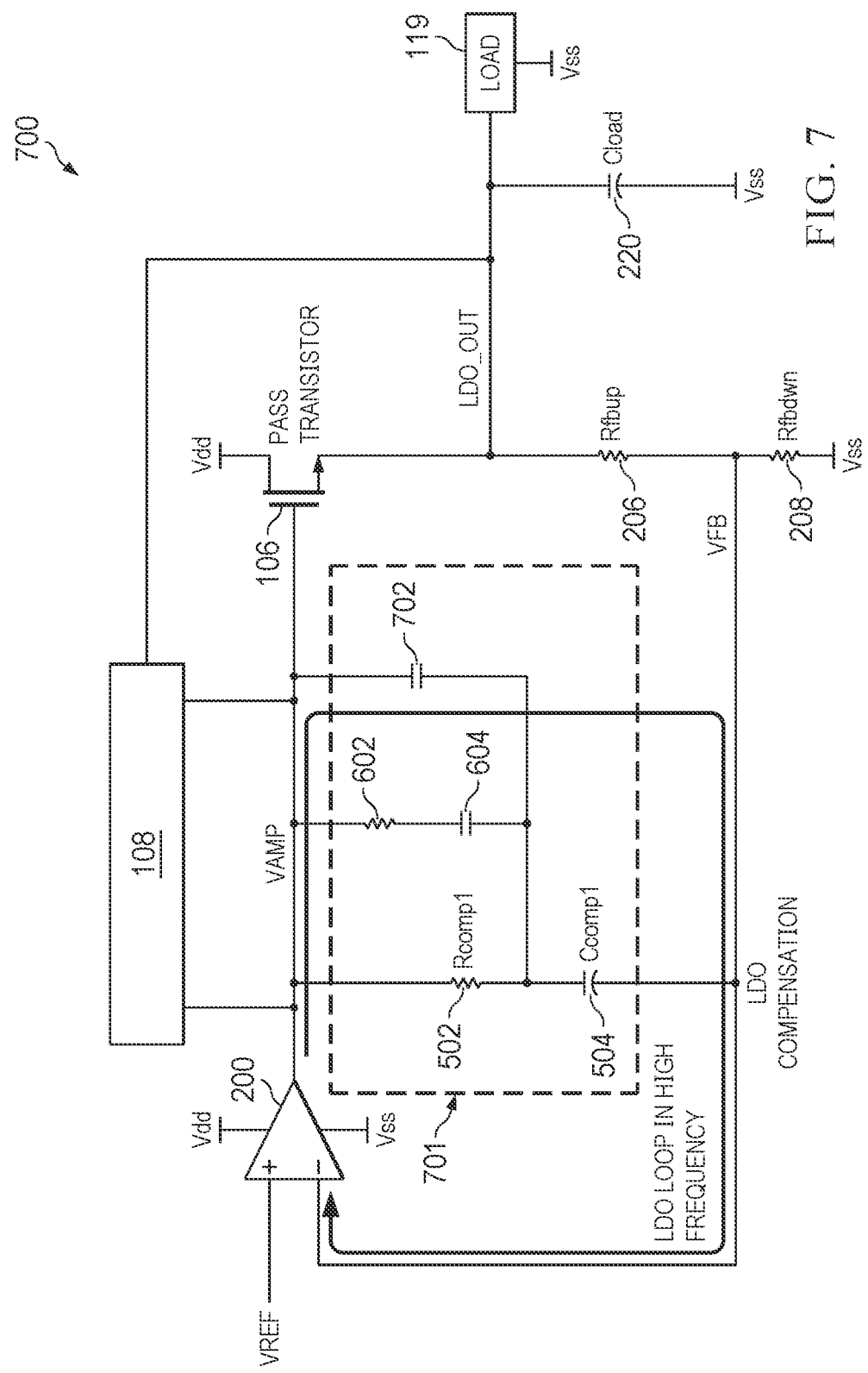
FIG. 7 is another example of the compensation circuitry in the voltage regulator of FIG. 1.

In the above-Equation 6 Rcomp2 is the resistance of the resistor 602 and Ccomp2 is the capacitance of the capacitor 604. Using the resistor 602 and the capacitor 604 the phase margin at high frequencies can be increased from 40 degrees to 78 degrees, thereby increasing the stability of the regulator circuitry 600. In FIG. 7, the structure of the capacitor

504 allows the UGB to be independent of the transconductance of the pass transistor 106 and the decoupling capacitor 220 without affecting the output voltage. Instead the UGB is dependent on the transconductance of the gain stage 200 (e.g., UGB=(gm_err_amp/C0)(Rfbup/(Rfbup+ (Rcomp1∥Rcomp2)))).

Although the parallel connected resistor 602, 604 are described in conjunction with the compensation circuitry 601, the parallel connected resistor 602 and capacitor 604 may be implemented in parallel with the capacitor 402 of the compensation circuitry 401 of FIG. 4.

FIG. 7 illustrates example regulator circuitry 700 including an alternative circuit implementation of the regulator compensation circuitry 202 of FIG. 2 in conjunction with the regulator circuitry 102 of FIG. 2 that improves the phase margin at higher output currents. FIG. 7 includes the pass transistor 106, the current limit circuitry 108, the load 119, the resistors 206, 208, and the capacitor 220 of FIG. 2. FIG. 7 further includes regulator compensation circuitry 701 to implement the regulator compensation circuitry 202 of FIG. 2. The regulator compensation circuitry 701 includes the example resistor 502 and the example capacitor 504 of FIG. 5 and the example resistor 602 and the capacitor 604 of FIG. 6. The example regulator compensation circuitry 701 further includes an example capacitor 702. Although FIG. 7 includes the second terminal of the current transistor 106 and the first terminal of the resistor 206 directly coupled, the terminals may be coupled via a connection to two external terminals (e.g., as shown in the terminal connection in FIG. 2 via the terminals 114, 116 of FIGS. 1 and/or 2).

The capacitor 702 of FIG. 7 has two terminals. The first terminal of the capacitor 702 is coupled to the current limit circuitry 108, the output terminal of the gain stage 200, the first terminal of the resistor 502, the first terminal of the resistor 602, and the current terminal of the transistor 106. The second terminal of the capacitor 702 is coupled to a second terminal of the capacitor 604, the second terminal of the resistor 502, and the first terminal of the capacitor 504. The capacitor is coupled in parallel to the resistor 502 and the series-connected resistor 602 and capacitor 604. The capacitor 702 may be added to improve phase margins even further at high frequencies where the pass transistor 106 is not operating (e.g., no gain). In this manner, the poles and zeros of the linear regulator 701 are based on combinations of the passive elements (e.g., resistors and capacitors). The pole and zero at the feedback point of the regulator circuitry 700 of FIG. 2 are provided in the below Equations 7 and 8.

$$Pole = \frac{1}{2\pi R' C_{comp3}} \quad \text{(Equation 7)}$$

$$Zero = \frac{1}{2\pi R'_{comp} C_{comp3}} \quad \text{(Equation 8)}$$

In the above Equations 7 and 8, Ccomp3 corresponds to the capacitance of the capacitor 702 and the values for R' and R'comp are shown in the below Equations 9 and 10.

$$R'_{comp} = R_{comp1} \| R_{comp2} \quad \text{(Equation 9)}$$

$$R' = R'_{comp} \| \left( R_{fb_{up}} \| R_{fb_{dwn}} \right) \quad \text{(Equation 10)}$$

Although the parallel connected capacitor 702 are described in conjunction with the compensation circuitry

701, the parallel connected capacitor 702 may be implemented in parallel with the capacitor 402 of the compensation circuitry 401 of FIG. 4.

Figure 8:
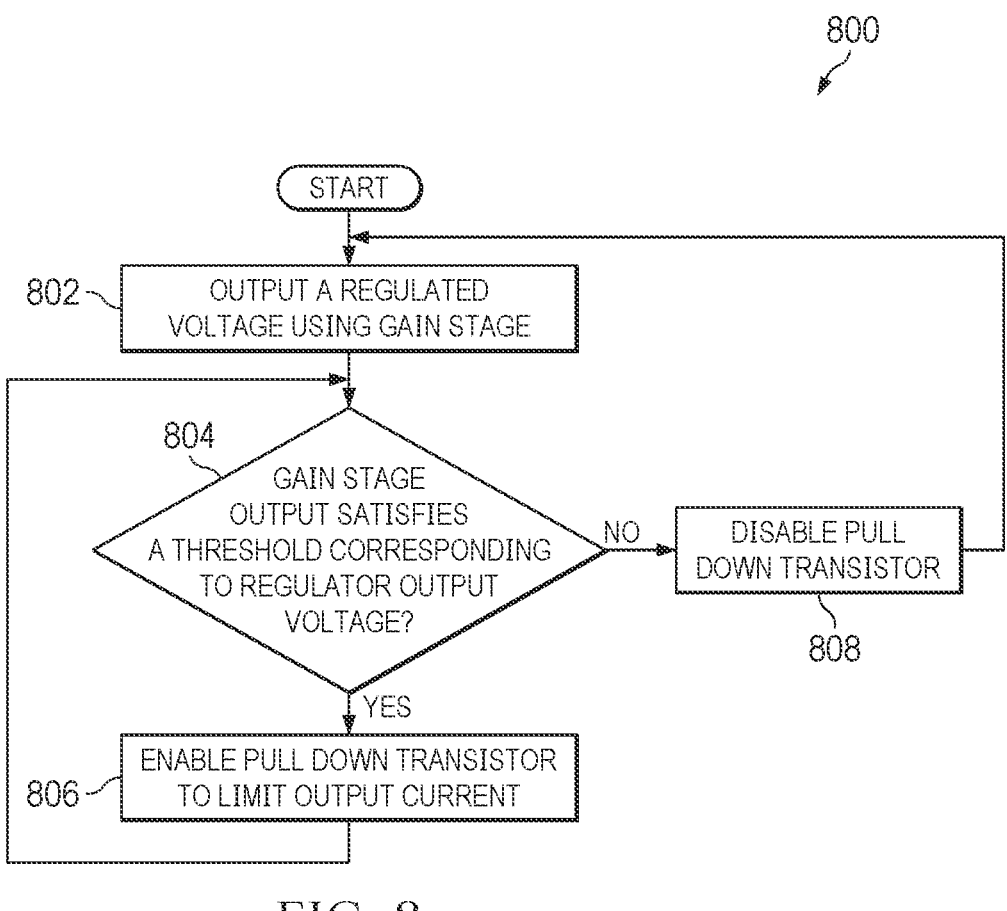
FIG. 8 is a flowchart representative of a method and/or operations that may be executed to implement power management circuitry of FIG. 1.

FIG. 8 is a flowchart representative of a method and/or example operations 800 that may be executed and/or instantiated by processor circuitry or any other circuitry of the power management circuitry 102 of FIGS. 1 and/or 2. Although the instructions and/or operations of FIG. 8 are described in conjunction with the power management circuitry 102 of FIGS. 1-2, the instructions and/or operations may be described in conjunction with any type of circuit that implements current limit circuitry in any type of system and/or implemented as a standalone circuit.

The machine-readable instructions and/or the operations 800 of FIG. 8 begin at block 802, at which the voltage regulator circuitry 104 regulates the output voltage at the output terminal 114 using the example gain stage 200. As described above, the gain stage 200 compares a scaled output voltage with a referenced voltage and outputs a voltage based on the difference between the scaled output voltage and the reference voltage. The output voltage is applied to the control terminal of the transistor 106 to regulate the supply voltage to a desired output voltage (e.g., the transistor 106 regulates the output voltage based on the amount of voltage at the control terminal of the transistor 106) using negative feedback.

At block 804, the example gain stage 216 of the current limit circuitry 108 determines if the output voltage of the gain stage 200 (e.g., VAMP, corresponding to the control terminal of the pass transistor 106) satisfies (e.g., is higher than) than a threshold voltage (e.g., VTRIG) corresponding to the output voltage at the output terminal 114. The threshold voltage corresponding to the output voltage at the output terminal 114 is the voltage at the first current terminal of the transistor 214. As described above, the current source circuitry 212 generates a current that flows through the diode-connected transistor 214 to generate the VTRIG voltage at the first current terminal. The VTRIG voltage is a sum of the output voltage at the output terminal 114 and the VGS of the transistor 106. The VTRIG voltage is determined by the current flowing from the current source circuitry 212 through the diode transistor 214 generating a VGS with respect to output voltage. If the gain stage 216 determines that the VAMP voltage is higher than the VTRIG voltage, the gain stage 216 determines that the output current is too high (e.g., above a threshold) and takes steps to lower the output current. If the gain stage 216 determines that the VAMP voltage is lower than the VTRIG voltage, the gain stage 216 continues to allow the voltage regulator circuitry 104 to regulate the output voltage.

If the example gain stage 216 determines that the output voltage of the gain stage 200 satisfies the threshold voltage (e.g., VTRIG) corresponding to the output voltage at the output terminal 114 (block 804: YES), the gain stage 216 enables and controls the pull down transistor 218 to decrease the voltage at the control terminal of the pass transistor 106, thereby limiting current flow at the output terminal 114 drawn by the load 119 (block 806) and control returns to block 804. As described above, enabling the pull-down transistor 218 causes current to be drawn from the gain stage 200 which decreases the voltage at the gate terminal of the pass transistor 106 to limit the amount of current being drawn from the pass transistor 106. If the example gain stage 216 determines that the output voltage of the gain stage 200 does not satisfy the threshold voltage (e.g., VTRIG) corresponding to the output voltage at the output terminal 114 (block 804: NO), the gain stage 216 disables the pull-down transistor 218 and control returns to block 802. As described above, disabling the pull-down transistor 218 stops the pull-down transistor 218 from decreasing the voltage at the control terminal of the pass transistor 106, thereby allowing the voltage regulator circuitry 104 to regulate the output voltage without the current limit circuitry 108 limiting the output current. If at block 808, the transistor 218 is already disabled, the gain stage 216 continues outputting a signal to keep the pull-down transistor 218 disabled to allow the voltage regulator circuitry 104 to control the output voltage.

An example manner of implementing the current limit circuitry 108 of FIG. 1 is illustrated in FIG. 2. However, one or more of the elements, processes and/or devices illustrated in FIG. 2 may be combined, divided, re-arranged, omitted, eliminated and/or implemented in any other way.

Further, the gain stage 200, 216, the regulator compensation circuitry 202, the transistors 106, 214, 218, the resistors 206, 208, and the current source circuitry 212, and/or more generally, the regulator circuitry 104 and/or current limit circuitry 108 of FIG. 2 may be implemented by hardware, software, firmware and/or any combination of hardware, software and/or firmware. As a result, for example, any of the gain stages 200, 216, the regulator compensation circuitry 202, the transistors 106, 214, 218, the resistors 206, 208, and the current source circuitry 212, and/or more generally, the regulator circuitry 104 and/or current limit circuitry 108 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the gain stage 200, 216, the regulator compensation circuitry 202, the transistors 106, 214, 218, the resistors 206, 208, and the current source circuitry 212, and/or more generally, the regulator circuitry 104 and/or current limit circuitry 108 of FIG. 2 is/are hereby expressly defined to include a non-transitory computer readable storage device or storage disk such as a memory, a digital versatile disk (DVD), a compact disk (CD), a Blu-ray disk, etc., including the software and/or firmware. Further still, the gain stage 200, 216, the regulator compensation circuitry 202, the transistors 106, 214, 218, the resistors 206, 208, and the current source circuitry 212, and/or more generally, the regulator circuitry 104 and/or current limit circuitry 108 of FIG. 2 may include one or more elements, processes and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather also includes selective communication at periodic intervals, scheduled intervals, aperiodic intervals, and/or one-time events.

Flowcharts representative of example hardware logic, machine-readable instructions, hardware implemented state machines, and/or any combination thereof for implementing the current limit circuitry 108 of FIGS. 1 and/or 2 are shown in FIG. 8. The machine-readable instructions may be one or more executable programs or portion(s) of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the entire program and/or parts thereof could alternatively be executed by a device other than the processor and/or embodied in firmware or dedicated hardware.

Further, although the example program is described with reference to the flowchart illustrated in FIG. 8, many other methods of implementing the current limit circuitry 108 may alternatively be used. For example, the order of execution of the blocks may be changed, and/or some of the blocks described may be changed, eliminated, or combined. Also or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, in which the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. As a result, the described machine-readable instructions and/or corresponding program(s) encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 8 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Example methods, apparatus and articles of manufacture have been described to improve accuracy and/or efficiency of current limit circuitry. The described methods, apparatus and articles of manufacture improve the accuracy and/or efficiency of current limit circuitry using a diode-connected device, a current source, and a gain stage.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

Descriptors "first," "second," "third," etc. are used herein when identifying multiple elements or components which may be referred to separately. Unless otherwise specified or known based on their context of use, such descriptors do not impute any meaning of priority, physical order, or arrangement in a list, or ordering in time but are merely used as labels for referring to multiple elements or components separately for ease of understanding the described examples. In some examples, the descriptor "first" may be used to refer to an element in the detailed description, while the same element may be referred to in a claim with a different descriptor such as "second" or "third." In such instances, such descriptors are used merely for case of referencing multiple elements or components.

In the description and in the claims, the terms "including" and "having" and variants thereof are to be inclusive in a manner similar to the term "comprising" unless otherwise noted. Unless otherwise stated, "about," "approximately," or "substantially" preceding a value means+/−10 percent of the stated value. In another example, "about," "approximately," or "substantially" preceding a value means+/−5 percent of the stated value. IN another example, "about," "approximately," or "substantially" preceding a value means+/−1 percent of the stated value.

The term "couple", "coupled", "couples", and variants thereof, as used herein, may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. Moreover, the terms "couple", "coupled", "couples", or variants thereof, includes an indirect or direct electrical or mechanical connection.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Although not all separately labeled in the FIGS. 1-7, components or elements of systems and circuits illustrated therein have one or more conductors or terminus that allow signals into and/or out of the components or elements. The conductors or terminus (or parts thereof) may be referred to herein as pins, pads, terminals (including input terminals, output terminals, reference terminals, and ground terminals, for instance), inputs, outputs, nodes, and interconnects.

As used herein, a "terminal" of a component, device, system, circuit, integrated circuit, or other electronic or semiconductor component, generally refers to a conductor such as a wire, trace, pin, pad, or other connector or interconnect that enables the component, device, system, etc., to electrically and/or mechanically connect to another component, device, system, etc. A terminal may be used, for instance, to receive or provide analog or digital electrical signals (or simply signals) or to electrically connect to a common or ground reference. Accordingly, an input terminal or input is used to receive a signal from another component, device, system, etc. An output terminal or output is used to provide a signal to another component, device, system, etc. Other terminals may be used to connect to a common, ground, or voltage reference, e.g., a reference terminal or ground terminal. A terminal of an IC or a PCB may also be referred to as a pin (a longitudinal conductor) or a pad (a planar conductor). A node refers to a point of connection or interconnection of two or more terminals. An example number of terminals and nodes may be shown. However, depending on a particular circuit or system topology, there may be more or fewer terminals and nodes. However, in some instances, "terminal", "node", "interconnect", "pad", and "pin" may be used interchangeably.

Example methods, apparatus, systems, and articles of manufacture corresponding to current limit circuitry with controlled current variation are disclosed herein. Further examples and combinations thereof include the following: Example 1 includes a circuit comprising a first amplifier having a first input terminal, a second input terminal, and an output terminal, a first transistor having a first terminal, a second terminal, and a control terminal, the first terminal of the first transistor coupled to a supply voltage terminal, the second terminal of the first transistor structured to be coupled to the second input terminal of the first amplifier, and the control terminal of the first transistor coupled to the output terminal of the first amplifier, a second transistor having a first terminal, a second terminal, and a control terminal, the first terminal of the second transistor coupled to the control terminal of the second transistor, and the second terminal of the second transistor coupled to the second terminal of the first transistor, and a second amplifier having a first input terminal, a second input terminal, and an output terminal, the first input terminal of the second amplifier coupled to the first terminal of the second transistor, and the second input terminal of the second amplifier coupled to the output terminal of the first amplifier.

Example 2 includes the circuit of example 1, further including a third transistor having a first terminal, a second terminal, and a control terminal, the first terminal of the third transistor coupled to the output terminal of the first amplifier, the second terminal of the third transistor structured to be coupled to a ground terminal, and the control terminal of the third transistor coupled to the output terminal of the second amplifier.

Example 3 includes the circuit of example 1, further including current source circuitry having a first terminal and a second terminal, the first terminal of the current source circuitry coupled to the supply voltage terminal, and the second terminal of the current source circuitry coupled to the first terminal of the second transistor and the first input terminal of the second amplifier.

Example 4 includes the circuit of example 1, in which the second terminal of the first transistor is structured to be coupled to the second input terminal of the first amplifier via a resistor.

Example 5 includes the circuit of example 1, further including compensation circuitry having a first terminal and a second terminal, the first terminal of the compensation circuitry coupled to the output terminal of the first amplifier, and the second terminal of the compensation circuitry coupled to the second input terminal of the first amplifier.

Example 6 includes the circuit of example 5, in which the compensation circuitry includes a resistor having a first terminal and a second terminal, the first terminal of the resistor coupled to the output terminal of the first amplifier, and a capacitor having a first terminal and a second terminal, the first terminal of the capacitor coupled to the second terminal of the resistor, the second terminal of the capacitor coupled to the second input terminal of the first amplifier.

Example 7 includes the circuit of example 6, in which the resistor is a first resistor and the capacitor is a first capacitor, further including a second resistor having a first terminal and a second terminal, the first terminal of the second resistor coupled to the output terminal of the first amplifier and the control terminal of the first transistor, and a second capacitor having a first terminal and a second terminal, the first terminal of the second capacitor coupled to the second terminal of the second resistor, the second terminal of the second capacitor coupled to the second terminal of the first resistor and the first terminal of the first capacitor.

Example 8 includes the circuit of example 1, in which the first input terminal of the first amplifier is a non-inverting terminal and the second input terminal of the first amplifier is an inverting terminal.

Example 9 includes the circuit of example 1, in which the first input terminal of the second amplifier is an inverting terminal and the second input terminal of the second amplifier is a non-inverting terminal.

Example 10 includes an apparatus comprising a voltage regulator configured to control a first transistor to regulate an output voltage to a desired value, and current limit circuitry configured to enable a second transistor to lower an output current when a voltage at a control terminal of the first transistor satisfies a threshold.

Example 11 includes the apparatus of example 10, in which the current limit circuitry is configured to disable the second transistor when the voltage at the control terminal of the first transistor is below the threshold.

Example 12 includes the apparatus of example 10, in which the threshold is a sum of the output voltage and a gate-to-source voltage of a diode-connected transistor in the current limit circuitry.

Example 13 includes the apparatus of example 10, in which the current limit circuitry includes current source circuitry and a diode-connected transistor to generate the threshold.

Example 14 includes the apparatus of example 10, in which the current limit circuitry is configured to compare the voltage at the control terminal of the first transistor to the threshold.

Example 15 includes the apparatus of example 10, in which lowering the output current lowers the output voltage and the voltage at the control terminal of the first transistor.

Example 16 includes the apparatus of example 15, in which the lowering of the output voltage lowers the threshold.

Example 17 includes the apparatus of example 10, in which the current limit circuitry is configured to fix a gate-to-source voltage of the first transistor.

Example 18 includes a circuit comprising a first transistor having a first terminal, a second terminal, and a control terminal, the first terminal of the first transistor coupled to the control terminal of the first transistor, and the second terminal of the first transistor structured to be coupled to an output terminal of a voltage regulator, and current source circuitry having a first terminal and a second terminal, the first terminal of the current source circuitry coupled to a supply voltage terminal, the second terminal of the current source circuitry coupled to the first terminal of the first transistor and the control terminal of the first transistor, an amplifier having a first input terminal, a second input terminal, and an output terminal, the first input terminal of the amplifier coupled to the first terminal of the first transistor and the second terminal of the current source circuitry and the second input terminal of the amplifier structured to be coupled to a terminal of the voltage regulator, and a second transistor having a first terminal, a second terminal, and a control terminal, the first terminal of the second transistor structured to be coupled to the terminal of the voltage regulator, the second terminal of the second transistor coupled to a ground terminal, and the control terminal of the second transistor coupled to the output terminal of the amplifier.

Example 19 includes the circuit of example 18, in which the first input terminal of the amplifier is an inverting terminal and the second input terminal of the amplifier is a non-inverting terminal.

Example 20 includes the circuit of example 18, in which the amplifier is a first amplifier, and the terminal of the voltage regulator corresponds to an output of a second amplifier and a control terminal of a third transistor, the output terminal of the voltage regulator corresponding to a terminal of third the transistor.

Example 21 includes the circuit of example 18, in which the first transistor is a diode-connected transistor.

Example 22 includes the circuit of example 18, in which the second transistor is a pull-down transistor.

Modifications are possible in the described embodiments, and other embodiments are possible, within the scope of the claims.

What is claimed is:

1. A circuit comprising:
   a first amplifier having a first input terminal, a second input terminal, and an output terminal;
   a first transistor having a first terminal, a second terminal, and a control terminal, the first terminal of the first transistor coupled to a supply voltage terminal, the second terminal of the first transistor structured to be coupled to the second input terminal of the first amplifier, and the control terminal of the first transistor coupled to the output terminal of the first amplifier;
   a second transistor having a first terminal, a second terminal, and a control terminal, the first terminal of the second transistor coupled to the control terminal of the second transistor, and the second terminal of the second transistor coupled to the second terminal of the first transistor; and a second amplifier having a first input terminal, a second input terminal, and an output terminal, the first input terminal of the second amplifier coupled to the first terminal of the second transistor, and the second input terminal of the second amplifier coupled to the output terminal of the first amplifier.

2. The circuit of claim 1, further including a third transistor having a first terminal, a second terminal, and a control terminal, the first terminal of the third transistor coupled to the output terminal of the first amplifier, the second terminal of the third transistor structured to be coupled to a ground terminal, and the control terminal of the third transistor coupled to the output terminal of the second amplifier.

3. The circuit of claim 1, further including current source circuitry having a first terminal and a second terminal, the first terminal of the current source circuitry coupled to the supply voltage terminal, and the second terminal of the current source circuitry coupled to the first terminal of the second transistor and the first input terminal of the second amplifier.

4. The circuit of claim 1, wherein the second terminal of the first transistor is structured to be coupled to the second input terminal of the first amplifier via a resistor.

5. The circuit of claim 1, further including compensation circuitry having a first terminal and a second terminal, the first terminal of the compensation circuitry coupled to the output terminal of the first amplifier, and the second terminal of the compensation circuitry coupled to the second input terminal of the first amplifier.

6. The circuit of claim 5, wherein the compensation circuitry includes:

a resistor having a first terminal and a second terminal, the first terminal of the resistor coupled to the output terminal of the first amplifier; and a capacitor having a first terminal and a second terminal, the first terminal of the capacitor coupled to the second terminal of the resistor, the second terminal of the capacitor coupled to the second input terminal of the first amplifier.

7. The circuit of claim 6, wherein the resistor is a first resistor and the capacitor is a first capacitor, further including:

a second resistor having a first terminal and a second terminal, the first terminal of the second resistor coupled to the output terminal of the first amplifier and the control terminal of the first transistor; and a second capacitor having a first terminal and a second terminal, the first terminal of the second capacitor coupled to the second terminal of the second resistor, the second terminal of the second capacitor coupled to the second terminal of the first resistor and the first terminal of the first capacitor.

8. The circuit of claim 1, wherein the first input terminal of the first amplifier is a non-inverting terminal and the second input terminal of the first amplifier is an inverting terminal.

9. The circuit of claim 1, wherein the first input terminal of the second amplifier is an inverting terminal and the second input terminal of the second amplifier is a non-inverting terminal.

10. An apparatus comprising:

a voltage regulator configured to control a first transistor to regulate an output voltage to a desired value; and current limit circuitry configured to enable a second transistor to lower an output current when a voltage at a control terminal of the first transistor satisfies a threshold; wherein the threshold is a sum of the output voltage and a gate-to-source voltage of a diode-connected transistor in the current limit circuitry.

11. The apparatus of claim 10, wherein the current limit circuitry is configured to disable the second transistor when the voltage at the control terminal of the first transistor is below the threshold.

12. The apparatus of claim 10, wherein the current limit circuitry includes current source circuitry and a diode-connected transistor to generate the threshold.

13. The apparatus of claim 10, wherein the current limit circuitry is configured to compare the voltage at the control terminal of the first transistor to the threshold.

14. The apparatus of claim 10, wherein lowering the output current lowers the output voltage and the voltage at the control terminal of the first transistor.

15. The apparatus of claim 14, wherein the lowering of the output voltage lowers the threshold.

16. The apparatus of claim 10, wherein the current limit circuitry is configured to fix a gate-to-source voltage of the first transistor.

17. A circuit comprising:

a first transistor having a first terminal, a second terminal, and a control terminal, the first terminal of the first transistor coupled to the control terminal of the first transistor, and the second terminal of the first transistor structured to be coupled to an output terminal of a voltage regulator; and current source circuitry having a first terminal and a second terminal, the first terminal of the current source circuitry coupled to a supply voltage terminal, the second terminal of the current source circuitry coupled to the first terminal of the first transistor and the control terminal of the first transistor;

an amplifier having a first input terminal, a second input terminal, and an output terminal, the first input terminal of the amplifier coupled to the first terminal of the first transistor and the second terminal of the current source circuitry and the second input terminal of the amplifier structured to be coupled to a terminal of the voltage regulator; and a second transistor having a first terminal, a second terminal, and a control terminal, the first terminal of the second transistor structured to be coupled to the terminal of the voltage regulator, the second terminal of the second transistor coupled to a ground terminal, and the control terminal of the second transistor coupled to the output terminal of the amplifier.

18. The circuit of claim 17, wherein the first input terminal of the amplifier is an inverting terminal and the second input terminal of the amplifier is a non-inverting terminal.

19. The circuit of claim 17, wherein the amplifier is a first amplifier, and the terminal of the voltage regulator corresponds to an output of a second amplifier and a control terminal of a third transistor, the output terminal of the voltage regulator corresponding to a terminal of third the transistor.

20. The circuit of claim 17, wherein the first transistor is a diode-connected transistor.

21. The circuit of claim 17, wherein the second transistor is a pull-down transistor.

* * * * *